US012583340B2

(12) United States Patent
Naderian

(10) Patent No.: US 12,583,340 B2
(45) Date of Patent: Mar. 24, 2026

(54) CHARGING APPARATUS FOR ELECTRIC VEHICLES

(71) Applicant: Mehrdad Naderian, Newburgh, IN (US)

(72) Inventor: Mehrdad Naderian, Newburgh, IN (US)

( * ) Notice: Subject to any disclaimer, the term of this patent is extended or adjusted under 35 U.S.C. 154(b) by 53 days.

(21) Appl. No.: 18/104,302

(22) Filed: Feb. 1, 2023

(65) Prior Publication Data

US 2024/0217352 A1 Jul. 4, 2024

Related U.S. Application Data

(60) Provisional application No. 63/436,658, filed on Jan. 2, 2023.

(51) Int. Cl.
| | |
|---|---|
| *H02J 50/10* | (2016.01) |
| *B60L 53/12* | (2019.01) |
| *B60L 53/36* | (2019.01) |
| *B60L 53/38* | (2019.01) |
| *B60L 53/57* | (2019.01) |
| *H02J 50/40* | (2016.01) |

(52) U.S. Cl.
CPC ............... *B60L 53/12* (2019.02); *B60L 53/36* (2019.02); *B60L 53/38* (2019.02); *B60L 53/57* (2019.02); *H02J 50/10* (2016.02); *H02J 50/40* (2016.02)

(58) Field of Classification Search
CPC .......... B60L 53/12; B60L 53/36; B60L 53/38; B60L 53/57; H02J 50/10; H02J 50/40; Y02T 10/70; Y02T 10/7072
See application file for complete search history.

(56) References Cited

U.S. PATENT DOCUMENTS

| | | | | |
|---|---|---|---|---|
| 1,258,280 A | * | 3/1918 | Voight | B60G 11/36 |
| | | | | 267/249 |
| 1,344,806 A | * | 6/1920 | Mcfarlane | G01G 19/04 |
| | | | | 177/163 |
| 6,374,971 B1 | * | 4/2002 | Siciliano | B60L 5/42 |
| | | | | 191/18 |
| 6,879,889 B2 | * | 4/2005 | Ross | B60L 50/51 |
| | | | | 342/357.31 |
| 10,967,740 B2 | * | 4/2021 | Dames | H05K 9/0075 |
| 2022/0337088 A1 | * | 10/2022 | Carter | H02J 50/005 |

* cited by examiner

*Primary Examiner* — Michael C Zarroli

(57) ABSTRACT

A power generating apparatus to charge electric Vehicles using unlimited number of magnetic bars embedded onto surface of pavements, to energize winding coil mounted beneath electric vehicles. The batteries are charged as electric vehicles drive down the Interstate or State Highways over magnetic bars at designated speed.

7 Claims, 6 Drawing Sheets

3    1    2

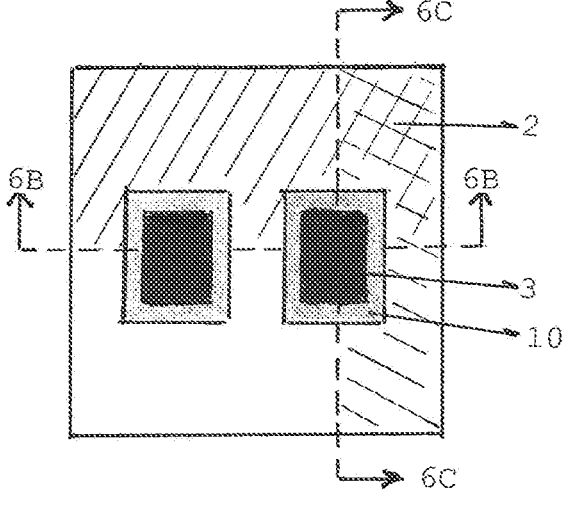
Fig.6A
Fig.6C
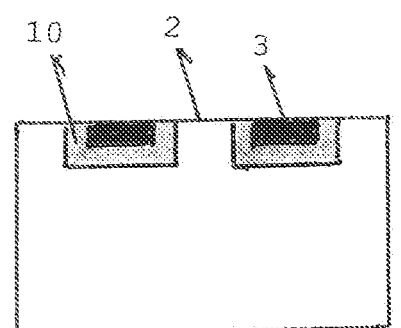
Fig.6B
Fig.6

CHARGING APPARATUS FOR ELECTRIC VEHICLES

RELATED APPLICATIONS

Applications listed below also proposing to utilize pavements to charge EVs. They were never put to use since on one hand they all have to be hooked to an external power source like generator or Solar systems or power grids. More significantly, on the other hand, they are not economical or practical.

Wearing surface of a pavement has around 5-to-10-year service life, which at that time has to be resurfaced, which forces removal and replacement of any devices embedded in them.

The present invention suffers the same faith, however removing and reusing the magnetic bars during the paving operation will come at a much lower cost which makes them more practical and economical. It is a type of operation a typical highway contractor can easily incorporate into their construction activity.

PRIOR APPLICATIONS

U.S. Pat. No. 10,967,740-B2 2021 Apr. 6 Dames; Andrew Nicholas
US-20220337088-A1 2022 Oct. 20 Carter; Vandette B.
U.S. Pat. No. 6,879,889-B2 2005 Apr. 12 Ross; Howard R.
U.S. Pat. No. 6,374,971-B1 2002 Apr. 23 Siciliano; Vito

BACKGROUND OF THE INVENTION

It is all but certain that all the pollution the fossil fuel has emitted into the atmosphere is causing global warming and climate change. In an effort to slow this colossal disaster nations are turning to electric vehicles (EVs) which unfortunately not only do they still rely on greenhouse-gas-producing power plants to charge up their batteries, but they also have a limited range.

Just to give an example as to how dire the situation is getting, back on Aug. 24, 2022, the State of California announced phasing out gasoline-engine vehicles in lieu of EVs by 2035. A week later they asked EV owners not to charge their vehicles during the peak hours, due to the shortage of electricity caused by drought.

It is the object of this invention to maintain and supplement charging of electric vehicles as they travel outside the city limits. Currently there are very limited or no charging stations on Interstate Highways, which hinders their appeal as a viable means of transportation to the traveling public or transporting goods and services by industries.

This invention charges EVs as they are traveling down the highways;

Without any additional pollution or carbon emission into the atmosphere.

Without taxing power grids or requiring power poles and lines.

Without the need for constructing thousands of charging stations across the Country.

Without wasting any time waiting for batteries to be charged while traveling.

Without any charging cost to motorists.

In the world of electrons and protons it is common knowledge (Faraday's Law) that by passing a copper wire through a magnetic field, voltage and current is generated in that wire, hence the principle the generators are built on.

An outside energy source like a power plant, gas engine, hydroelectric dam or wind is utilized to spin the generator and produce electricity.

The object of the present invention is to generate current by restructuring and reconfiguring components like what is used in the making of a conventional generator in order to charge EVs as they drive down the highways.

In an effort to cut back on greenhouse effects, there is a global attempt among industrial nations to phase out internal combustion vehicles in lieu of EVs. Unfortunately, their limited range keeps them from being a viable alternative until every gas station outside the city limits in the country is accompanied by a charging station beside it.

After decades of construction and spending an enormous budget, a transformation of this magnitude is not entirely impossible, however these charging stations still rely on power plants to power them up which could take away the benefits of converting to EVs to cut back on greenhouse gasses.

Furthermore, the biggest obstacle that cannot be conquered, is to expect a family going on vacation, or a businessperson going to a meeting to wait in a charging station for a couple of hours every few hundred miles to charge their EVs.

There are other charging methods like wireless charging pads being experimented with that are like charging stations and share the same challenges. They require additional power supply, and they are too costly to construct and simply not practical or feasible.

The invention proposed by this application can be constructed at a fraction of the cost compared to other alternatives and it could be completed nationwide in only a few years once it becomes shovel ready. The best aspect of this invention is the fact that it does not require any outside power source to be functional and charge EVs.

SUMMARY OF THE INVENTION

The present invention proposes installation of magnetic bars flush with the surface of pavements. The dimensions, spacing and number of these bars are to be determined by EV makers to meet their requirements for optimum performance.

Obviously the present invention requires full cooperation and adoption by the Federal and State Transportation Departments. Fortunately, the current Administration and even some of the states like California are fully aware of this looming climate disaster and are fully supporting, promoting, and even subsidizing green energy innovations.

As a retired road and bridge construction engineer, I am certain these magnetic bars can be easily, quickly, and economically installed on pavements without posing any danger to motorists. These magnetic bars shall be installed using equipment and technology readily available and regularly utilized.

These magnetic bars shall be installed using the same material approved for highway application in the same method and manners commonly used for installation of Raised Pavement Markers (RPMs), Rumble Strips and many other instruments or devices embedded in pavements for various purposes.

In short, installation and presence of these bars in pavements throughout the nation's Interstates and State Highways is entirely in line with road construction practices and devices already out there and most likely will not even be noticed by motorists.

The present invention also requires installation of a winding coil beneath electric vehicles to work in tandem with magnetic bars. Winding coils shall be suspended under carriage using pin and hanger links which can lower the winding coils or stow them away via an actuator while not in use or not in charging mode. The dimensions and number of these winding coils along with their specifications is to be determined by EV makers to meet their requirements for optimum performance.

DESCRIPTION OF THE VIEWS OF THE DRAWINGS

FIG. 6 Various views of magnetic bars in the pavement.

FIG. 6a Plan view of bars secured in pavement by epoxy.

FIG. 6b Cross section BB longitude view of the bars and epoxy in pavement.

FIG. 6c Cross section CC transverse view of the bar and epoxy in pavement.

DETAILED DESCRIPTION OF THE INVENTION AND HOW IT WORKS

1 Electric vehicle (EV).
2 Surface of the pavement with cavities cut into it.
3 Magnetic bars embedded in pavement cavities.
4 Winding coil.
5 Mechanical or electric actuator to position the winding coil.
6 Pin and hanger links for supporting the winding coil.
7 Actuator link with on/off switch to raise or lower the winding coil.
8 Winding coil's housing.
9 Primary EV battery cell.
10 Epoxy bonding compound approved for highway application.

How it Works

Once all the parameters of the components have been established and they are put in place as described, the motorists will be able to charge their EVs while they are being driven at designated speed as if a generator is attached to them to keep their batteries charged up.

All the driver must do is just to simply drive over the lane or lanes that have the magnetic bars 3 embedded in them and lower the winding coil (4) via switch (7) located on the dash. Preferably and ideally, it would be best if sensors automatically perform this function.

The bars shall be installed for hundreds of miles on the Interstates. They could be installed intermittently like every other mile, or every other ten-mile stretch of the highway if possible and still functional, to make them more economical. These kinds of variables could eventually be tweaked for optimum output and efficiency by further testing and trials.

In part A, a contract with proposal, specifications and drawings is let and a contractor wins to perform the installation of magnetic bars onto the pavement on designated miles of a highway at a certain location indicated in the contract.

Figure 1:
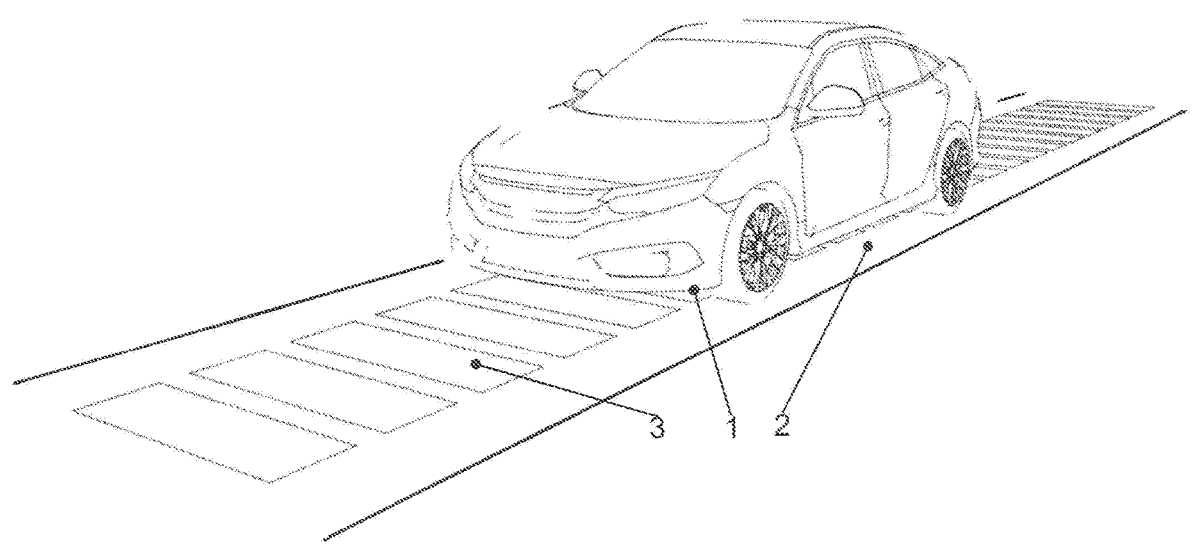
FIG. 1 Perspective view of the invention. It shows an electric vehicle traveling over magnetic bars.
Figure 2:
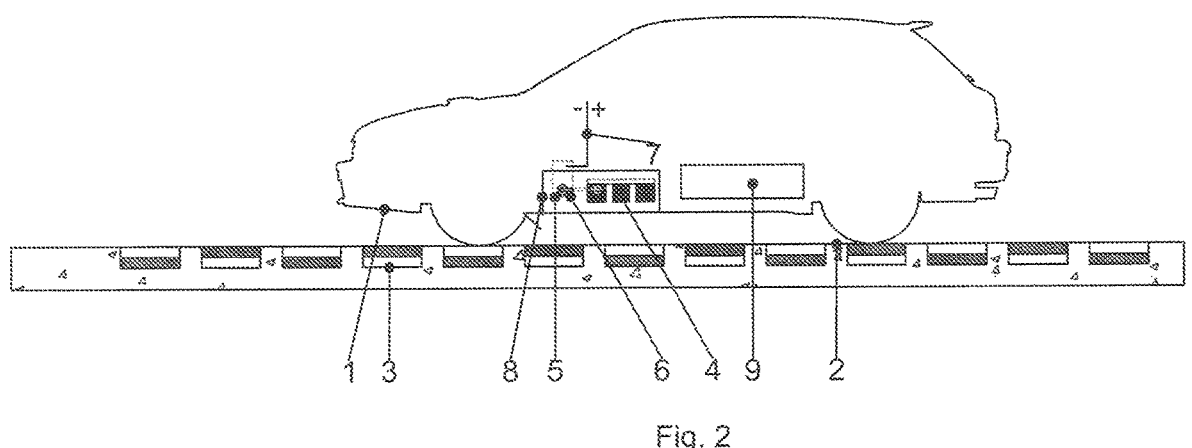
FIG. 2 Profile view of the invention. It shows the EV with its winding coil retracted up in its housing. Not in use.
Figure 3:
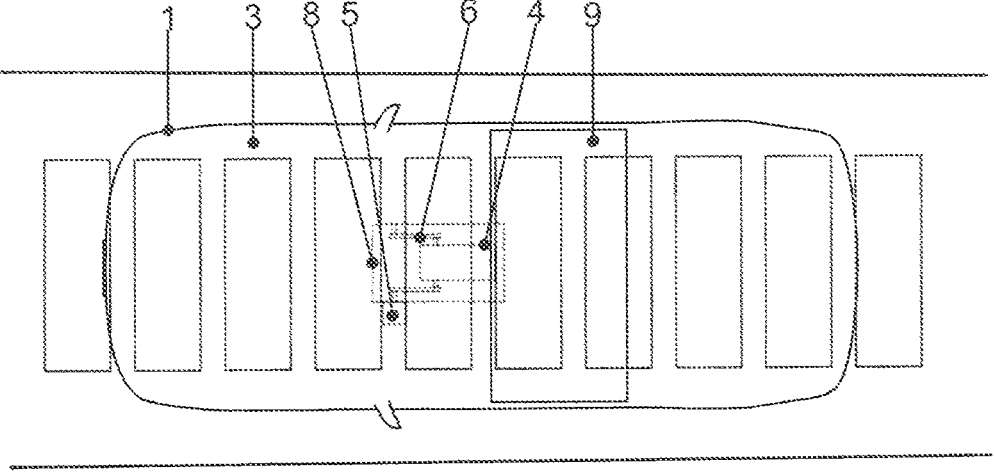
FIG. 3 Plan view of the EV on the road with its winding coil over the magnetic bars.
Figure 4:
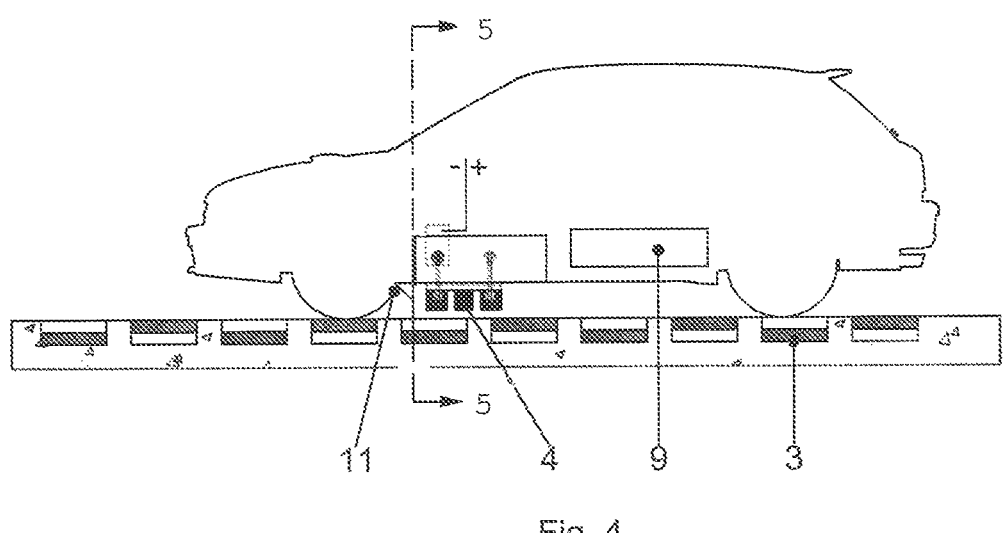
FIG. 4 Profile view of the EV with the winding coil extended down to hover over the magnetic bars. In charging mode.
Figure 5:
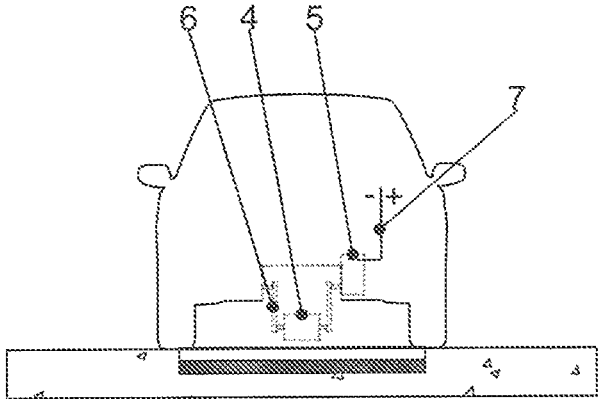
FIG. 5 Cross section AA. Through the EV and pavement. Also showing a magnetic bar and the winding coil.
Figure 7:
FIG. 7 Winding coil. Their exact geometry and size are determined by EV makers to meet their requirements.

Following the lane closure, a convoy of equipment and crew first begin to cut cavities onto the surface of the pavement as designated in the plans using diamond-tipped saws. Like the layout shown in FIG. 1.

Right behind them, the next crew coats the cavities with epoxy bonding compound approved for highway application and drops in the magnetic bars and tools them flush with the surface of the pavement. Once the epoxy is cured the lane is opened back up to traffic.

Part B requires installation of a winding coil underneath EVs. These winding coils are manufactured and installed in EVs in collaboration between EV makers.

Once these two parts are complete, the EV drivers can simply head out of the city using their overnight charge. Once they reach these lanes of the highways equipped with magnetic bars, they will lower their winding coil and drive for unlimited miles while their batteries are getting charged without stopping or needing any charging stations or causing any pollution.

What is presented here is all Twentieth Century technology. Everything needed is readily available. It could be implemented and put to work safely, economically, and quickly without any harmful byproducts. As was stated earlier, it will not tax the power grids and there is no waiting around to get your batteries charged in stations.

EVs can drive coast to coast nonstop forever without an ounce of carbon emission, without taking a single amp off the grids or wasting a second of their time in charging stations.

The invention claimed is:

1. The invention claimed is an electric vehicle (EV) charging apparatus, comprising:
    magnetic bars embedded in the surface of a pavements, and
    a winding coil mounted beneath the EV by pin and hanger links,
    an actuator configured to lower the winding coil over the wireless magnetic bars,
    and wherein said pavement is indented with cavities previously saw cut to house the magnetic bars.

2. The charging apparatus as in claim 1, wherein said magnetic bars are secured flush with the surface of the pavement using epoxy bonding adhesive.

3. The charging apparatus as in claim 1, wherein the winding coil is protected with an aerodynamic shield against debris.

4. An electric vehicle (EV) charging apparatus comprising:
    magnetic bars embedded in a roadway surface, said roadway surface indented with cavities previously saw cut to house the magnetic bars,
    a winding coil mounted in the EV and attached to an underside of the EV using a pin and hanger link system, and wherein the winding coil interacts with the magnetic bars to charge the EV.

5. The charging apparatus of claim 4, further comprising an actuator to lower said winding coil over said magnetic bars.

6. The charging apparatus of claim 5, wherein said magnetic bars are secured flush with the surface of the pavement using epoxy bonding adhesive.

7. The charging apparatus as in claim 4, wherein the winding coil is protected with an aerodynamic shield against debris.

\* \* \* \* \*